March 6, 1934. A. H. SHOEMAKER 1,949,695
WHEEL, RIM, AND TIRE CONSTRUCTION
Filed April 23, 1932
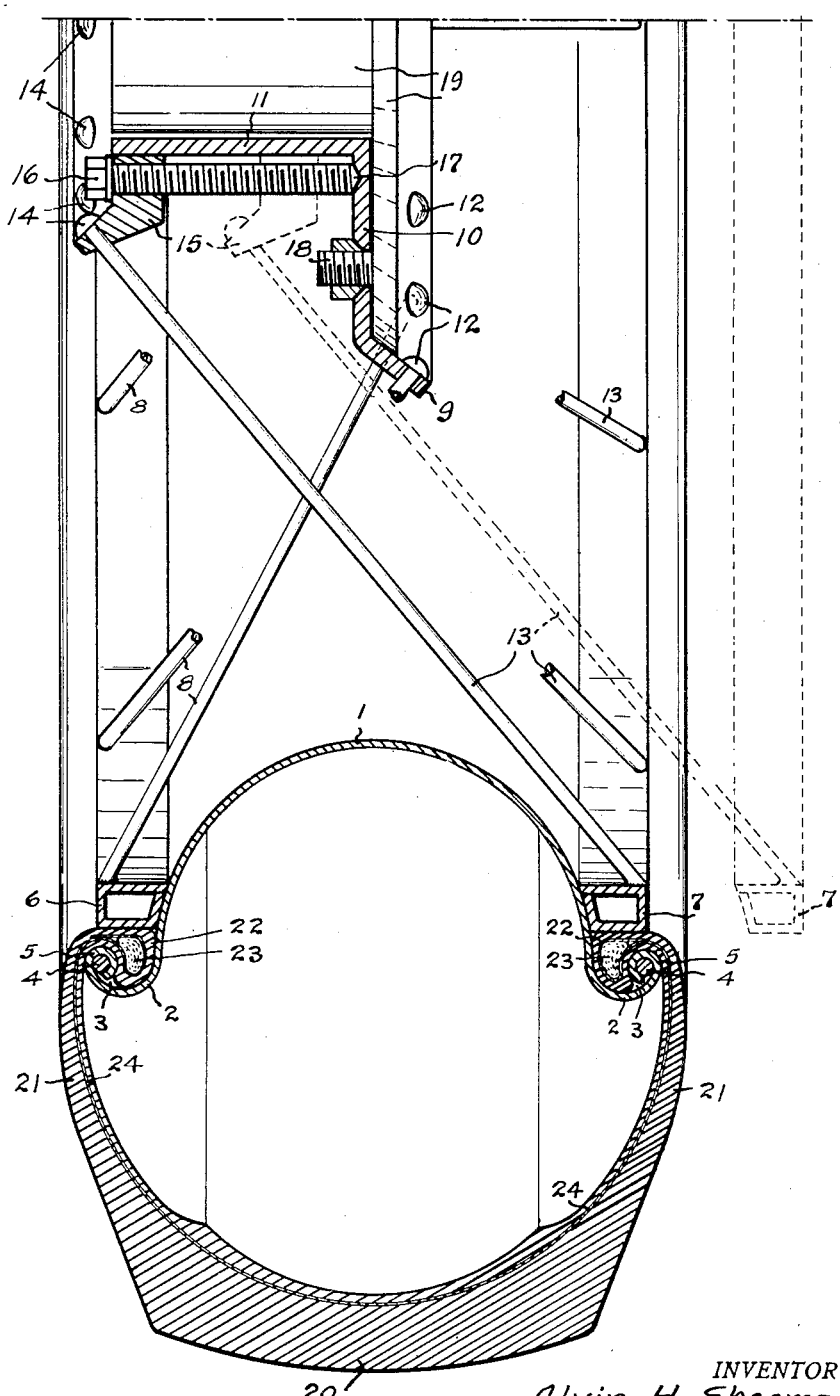
INVENTOR
Alvin H. Shoemaker
BY Fred C. Matherly
ATTORNEY Patented Mar. 6, 1934

1,949,695

UNITED STATES PATENT OFFICE 1,949,695

WHEEL, RIM, AND TIRE CONSTRUCTION

Alvin H. Shoemaker, Seattle, Wash.

Application April 23, 1932, Serial No. 607,109

8 Claims. (Cl. 301—55)

My invention relates to improvements in a combined wheel, rim and pneumatic tire and the general objects of my invention are to provide a simple and efficient wire wheel and rim mechanism adapted to grip and securely hold the bead portions or edges of a radial cord pneumatic tire of the type in which the said tire bead portions are elastic and the tire wall portions adjacent said tire beads are very flexible and pass around the outside edges of the rim.

Another object of my invention is to provide a wire wheel structure which is adapted to grasp and securely hold the bead edges of a radial cord pneumatic tire and to hold the same to a reduced diameter after it is put into use whereby the rubber within said tire is maintained under compression.

Another object is to provide a wheel of this nature having an air tight rim and having a tire adapted to make an air tight contact with said rim whereby said tire may be used without an inner tube.

A more specific object of my invention is to provide a wheel rim having its edges curved inwardly toward the axis of said rim, together with a tire having elastic edge portions extending around the outsides of said inwardly curved rim edges and a wire spoke wheel having two sets of spokes which sets of spokes are relatively crossed as respects each other and support two locking rings positioned on opposite sides of the rim, the hub support for one set of said spokes being movable whereby one of the locking rings may be moved to selectively clamp or release said rim and said tire bead portions.

In the manufacture of pneumatic tires if the usual non-elastic or substantially non-elastic bead rings are omitted or are replaced by longitudinally elastic bead members at the time the tire is molded the process of manufacture is greatly simplified and the cost of production of the tires is very much reduced and the tires are rendered more flexible and more easily handled in shipment and marketing and it is further possible to reduce the diameter of such tires before they are subjected to wear thus placing the rubber of the tire under compression.

In pneumatic tires I find that if radial cord reinforcing alone is used in the tire and all longitudinal and diagonal reinforcing is omitted I am able to produce a tire which has relatively thin side walls, and one which has great flexibility, and which will pass over small obstructions very easily, and which is free running and which is economical on power and has no interply friction and therefore does not tend to heat when in use. I also find that when radial cord reinforcing is used and longitudinal and diagonal reinforcing is done away with the tires are liable to be unstable and subject to side sway and shimmy and it becomes necessary to spread the bead portions of the tires widely apart. When the tire bead portions are thus spread widely apart it is necessary to provide a type of bead receiving means which is especially adapted to grip and hold the bead portions of the tire. The necessity for this specially constructed holding means is greater on account of the thinness and flexibility of the side walls of the tire and on account of the fact that internal air pressure in a radial cord tire will not effectively hold the tire bead portions outwardly against bead receiving means if said bead portions are widely spread apart. A specially constructed tire bead receiving and holding means is also essential when an air seal is to be formed at this location and no inner tube is to be used in the tire. My bead engaging and holding means is especially designed for use with a radial cord tire in which the bead portions are widely spread apart and is not practical for use in connection with a conventional type of tire having longitudinal and diagonal reinforcing, due partly to the fact that the side walls of longitudinally and diagonally reinforced tires are too thick and too stiff to be drawn around rim members in the manner herein disclosed and will cut and chafe at the locations where they pass around such rim members.

Other and more specific objects of my invention will be apparent from the following description taken in connection with the accompanying drawing.

In the drawing the view is a radial cross section of one half of a wheel, hub and tire, certain parts being broken away and certain other parts being shown in elevation.

Referring to the drawing I show a deep channeled rim 1 of substantially semi-circular cross section, having at its two sides, tire bead receiving portions 2 which are bent reversely to form grooves 3, said grooves opening toward the axis of said rim. The extremities of the reversely bent portions 2 are further bent around reinforcing wires 4 to afford rolled portions 5 over which the edges of a tire may pass as hereinafter set forth.

Two clamping rings 6 and 7 are provided on opposite sides of the arcuate portion of the rim, said clamping rings being of smaller external diameter than the rolled portions 5 whereby they may be positioned a short distance inward from the open side of said bead receiving grooves 3 when the clamping rings are pressed against the sides of the arcuate rim. These clamping rings 6 and 7 may, if desired, be of hollow construction, as shown, for purposes of lightness and strength.

The clamping ring 6 is connected by a plurality of spokes 8 with an inclined marginal portion 9 of a radial flange 10 which forms part of a hub 11. The spokes 8 may pass through the part 9 and have heads 12 thereon which draw against the part 9 and may also be welded at the location of these heads if desired. The outer ends of the spokes 8 are preferably welded to the clamping ring 6 and said spokes extend diagonally from the inner end of the hub to the clamping ring 6 on the opposite or outer side of the rim.

The clamping ring 7 is connected by another set of spokes 13 with an inclined flange 14 on a collar 15 which is slidably and adjustably mounted on the hub 11. The outer ends of the spokes 13 are preferably welded to the clamping ring 7 and these spokes 13 extend diagonally of the wheel from the outer end of the hub to the clamping ring 7 at the inner side of the rim. It will be noted that the two sets of spokes 8 and 13 are crossed relative to each other between the rim and the hub of the wheel.

A plurality of set screws 16 are threaded through the adjustable collar 15 and bear against the hub flange 10. The ends of these set screws are preferably cone shape as indicated at 17 and rest within suitable cone shaped recesses in the hub flange 10. This will prevent rotary movement of the collar 15 on the hub 11 in case a cylindrical hub 11 is used. However the collar 15 may be splined on the hub 11 or the hub may be of non-cylindrical shape so that the collar 15 will be prevented from turning thereon.

The flange 10 is arranged to receive the usual studs 18 which are found on the hub assembly 19 of motor vehicles.

The tire used in connection with this wheel and rim comprises a tread portion 20, side walls 21 and bead portions 22 which have longitudinally elastic bead fillers 23 of relatively firm and substantial cross section embedded therein. The reinforcing in the tire is in the nature of radial cords 24 which extend straight around the tire from one bead member to the other and are passed around each bead filler 23 so that the reinforcing is firmly anchored to the bead filler. These radial cords 24 are at substantially right angles to the medial plane of the tire and no longitudinal or diagonal binder is used. Each of the cords 24 is embedded in rubber so that there is no friction between adjacent cords and said cords form a relatively thin reinforcing layer which lies close to the inner wall of the tire thus making it possible to construct a tire with very thin and flexible side walls which may readily be drawn around the rolled portions 5 of the rim and which will cooperate with these rolled portions 5 to form an air seal thus making it possible to use the tire without an inner tube, it being understood that the rim 1 is made air tight.

In the operation of this wheel, when a tire is to be applied to, or removed from, the rim 1, the set screws 16 are retracted to permit the collar 15 to be moved inwardly toward the hub flange 10, as shown by dotted lines. This permits the clamping ring 7 to be moved away from the rim 1 far enough to make it possible to readily insert or remove one bead portion of the tire and obviously permits the rim 1 to be moved away from the clamping ring 6 far enough to permit the insertion or removal of the other bead portion of the tire. After a tire has been applied to the rim by placing the bead portions thereof in the bead receiving grooves 3 the set screws 11 may be turned to move the collar 15 outwardly toward the position shown by full lines in the drawing, thus exerting an even tension on all of the spokes 8 and 13 and drawing the clamping rings 6 and 7 tightly against the arcuate sides of the rim 1 and tightly into peripheral contact with the bead portions 22 of the tire. The tire bead portions 22 are thus crowded firmly into the rim grooves 3 and are held in these rim grooves by the peripheries of the clamping rings 6 and 7. When the tire is inflated the expanding pressure against the walls of the tire will tend to press the tire bead portions more firmly against the periphery of the clamping rings 6 and 7.

The set screws 16 are preferably constructed and proportioned so that the heads of said set screws will be jammed against the collar 15 at the time the proper tension is exerted on the spokes 8 and 13. To provide for a limited adjustment or take up between the screws 16 and collar 15 I may place a washer 16' between the head of each set screw 16 and the adjacent face of the collar. If the tension of the spokes becomes slack these washers 16' may be replaced by thinner washers or may be entirely removed, thus compensating for wear.

It will be noted that the two sets of spokes 8 and 13 of this wheel extend diagonally across the wheel in such a manner as to provide a very strongly trussed wheel structure, one set of said spokes serving as tension members resisting side thrust in one direction and the other set of spokes serving as tension members resisting side thrust in the opposite direction. In my wheel all of the spokes are within the limits of the sides of the tire and it is substantially impossible to damage said spokes by bringing them into contact with a sidewalk curb or like obstruction. With this arrangement of spokes it will also be apparent that all of the spokes will be under substantially equal tension at all times.

It will be noted that the central plane of the tire and rim coincides substantially with the outer face of the flange 10 thus insuring the correct positioning of the tire to maintain the desired road gauge of the vehicle on which the wheel is installed.

The tire 20—21 is molded to a larger diameter than it is to be when in service and the diameter of said tire is reduced when it is placed on the rim, thus placing the rubber, especially in the tread portion of the tire under compression when in service, whereby said rubber will have greater wearing qualities and will tend to close up any cuts or punctures which may be made therein. The rim serves as a non-elastic means for firmly and securely holding the tire to a reduced diameter after it has been placed on such rim. The radial cord reinforcing and the absence of longitudinal and diagonal reinforcing make this tire especially well adapted to be reduced in diameter and placed under compression in this manner, it being obvious that longitudinal contraction of this tire will only compress the rubber while longitudinal contraction of a tire which is longitudinally or diagonally reinforced will slacken the reinforcing upon which the longitudinally or diagonally bound tire is dependent for its strength. To permit the diameter of my radial cord tire to be thus reduced when the tire is applied to the rim it is obviously necessary that the tire beads and bead fillers must be longitudinally elastic.

The foregoing description and accompanying drawing clearly disclose what I now regard as a preferred embodiment of my invention, but it will be apparent that this disclosure is merely illustrative and that such changes in the invention may be made as are fairly within the scope and spirit of the following claims.

I claim:

1. In devices of the class described, a wheel hub, a deep channeled wheel rim of arcuate cross section, a clamping ring positioned on each side of said wheel rim and engaging the arcuate sides of said rim, a set of spokes extending between each side of said hub and the clamping ring on the opposite side of said rim, said two sets of spokes being crossed relative to each other, the outer ends of both sets of said spokes being secured to the clamping rings, the inner ends of all of the spokes of one set being fixedly secured to the hub, and adjustable tension exerting means connected with all of the spokes of one of said sets of spokes at the location of the hub whereby all of the spokes of said set of spokes may be moved in unison.

2. In devices of the class described, a wheel rim, a wheel hub disposed coaxially within said wheel rim, a clamping ring positioned on each side of said wheel rim supporting said rim, a set of spokes secured to each clamping ring and extending between each clamping ring and the opposite side of the hub, said two sets of spokes being crossed relative to each other, the inner ends of the spokes of one set being secured to the hub, movable collar means on the hub supporting the ends of one set of said spokes and means for adjusting said collar whereby said set of spokes may be tensioned.

3. In devices of the class described, a wheel rim, a hub disposed coaxially within said wheel rim, a collar adjustable lengthwise of said hub, two clamping rings positioned on opposite sides of said wheel rim supporting said rim, a set of spokes secured to and extending between one of said clamping rings and said adjustable collar, whereby said clamping ring may be moved toward or away from said wheel rim by adjustment of said collar, and another set of spokes secured to and extending between said other clamping ring and a fixed part of said hub, said two sets of spokes being crossed relative to each other.

4. In devices of the class described, a wheel rim, a hub coaxial with said wheel rim, a pneumatic tire having bead portions extending inwardly over the edges of said rim, a clamping ring positioned on each side of said rim, said clamping rings supporting said rim and retaining the bead portions of said tire in engagement with said rim, a set of spokes secured to each clamping ring and extending between each clamping ring and the opposite side of the hub, said two sets of spokes being crossed relative to each other, the ends of the spokes of one set being secured to said hub and adjustable means on the hub supporting the ends of the other set of spokes.

5. In devices of the class described, a wheel rim having annular bead receiving grooves in the edges thereof opening toward the axis of said wheel rim, a hub positioned coaxially within said wheel rim, a collar adjustable lengthwise of said hub, a pneumatic tire having bead portions extending inwardly over the edges of said wheel rim and seated within said bead receiving grooves, a clamping ring positioned on each side of said wheel rim engaging said wheel rim and said tire beads, a set of spokes secured to and extending between one of said clamping rings and a fixed part of said hub, and another set of spokes secured to and extending between the other clamping ring and said adjustable collar whereby predetermined movement of said adjustable collar will selectively clamp or release said tire beads and said wheel rim.

6. In devices of the class described, a deep channeled wheel rim of arcuate cross section having annular bead receiving grooves in the edges thereof opening toward the axis of said wheel rim, a hub positioned coaxially within said wheel rim, a collar movable lengthwise on said hub, screw means adjustably supporting said collar, a pneumatic tire having bead portions extending inwardly over the edges of said rim and seated within said grooves, a clamping ring positioned on each side of said wheel rim and movable into side engagement with said wheel rim and peripheral engagement with the adjacent tire bead portions, a set of spokes secured to and extending between one of said clamping rings and a fixed part of said hub, and another set of spokes secured to and extending between the other clamping ring and said adjustable collar, whereby movement of said adjustable collar in one direction on said hub will clamp said wheel rim and said tire beads and movement of said adjustable collar in an opposite direction on said hub will release said wheel rim and said tire beads.

7. In a tire and wheel of the class described, a wheel rim having its edges bent inwardly toward the axis thereof to form annular tire bead receiving grooves, the extremities of said inwardly bent edges having rolled portions thereon, a pneumatic tire having bead portions extending inwardly over the edges of said rim and seated in said grooves, a hub positioned coaxially within said wheel rim, said hub having an annular flange terminating in an inclined peripheral portion, two clamping rings positioned on opposite sides of said wheel rim, said clamping rings being of smaller diameter than said inwardly bent edges of said rim whereby they may be positioned radially inward from said annular tire bead receiving grooves in engaging relation to said tire bead portions, a collar movable on said hub, screw means adjustably supporting said collar in spaced relation from said annular hub flange, a set of wire spokes secured to and extending diagonally between said inclined peripheral portion of said annular hub flange and the clamping ring on the opposite side of said rim, and another set of wire spokes secured to and extending diagonally between said movable collar and the other clamping ring, said two sets of wire spokes being relatively crossed between said wheel rim and said hub.

8. In devices of the class described, a wheel hub, a wheel rim, a clamping ring positioned on one side of said wheel rim supporting said wheel rim on one side, means supporting the other side of said wheel rim, a set of spokes extending diagonally between said clamping ring and the end of the hub at the opposite side of the wheel from said clamping ring, a collar longitudinally movable relative to the hub and connected with the inner ends of said set of spokes, the outer ends of the spokes being secured to the clamping ring, and adjusting means connected with said collar whereby said collar may be moved longitudinally of said hub and tension exerted on the spokes to clamp said clamping ring against said wheel rim.

ALVIN H. SHOEMAKER.